(12) United States Patent
Kozinn

(10) Patent No.: US 7,584,122 B2
(45) Date of Patent: Sep. 1, 2009

(54) SYSTEM AND METHOD FOR FITTING CLOTHING

(75) Inventor: Jacob Karl Kozinn, New York, NY (US)

(73) Assignee: Saint Laurie Ltd., New York, NY (US)

( * ) Notice: Subject to any disclaimer, the term of this patent is extended or adjusted under 35 U.S.C. 154(b) by 969 days.

(21) Appl. No.: 10/468,249

(22) PCT Filed: Mar. 8, 2002

(86) PCT No.: PCT/US02/07169

§ 371 (c)(1),
(2), (4) Date: Aug. 18, 2003

(87) PCT Pub. No.: WO02/076251

PCT Pub. Date: Oct. 3, 2002

(65) Prior Publication Data

US 2004/0083142 A1     Apr. 29, 2004

(51) Int. Cl.
*G06Q 30/00* (2006.01)
(52) U.S. Cl. .......................... 705/26; 705/37
(58) Field of Classification Search .................... 705/26
See application file for complete search history.

(56) References Cited

U.S. PATENT DOCUMENTS

2002/0138170 A1\* 9/2002 Onyshkevych et al. ...... 700/130

OTHER PUBLICATIONS

Einsenberg, Anne, If the shoe fits, click it Scans may make shopping a science, New York times [Rockies Edition], Denver Post, Denver, CO, Aug. 31, 1998, downloaded from ProQuest Direct on the Internet on Mar. 17, 2009, 5 pages.\*

Hardaker, et al., International Journal of Clothing Science and Technology, Bradford, 1998, vol. 10, Iss. 2, p. 114, downloaded from ProQuest Direct on the Internet on Mar. 17, 2009, 12 pages.\*

Trieb et al., 3-D body scanning—systems, method and applications for automatic interpretation of 3D surface anthropometrical data, Proceedings of the Human Factors and Ergonomics Society—Annual Meeting, Santa Monica, 2000, vol. 6, p. 844, downloaded from ProQuest Direct on the Internet on Mar. 17, 2009, 8 pages.\*

DesMarteau, Kathleen, CAD: Let the fit revolution begin, Bobbin. Columbia: Oct. 2000. vol. 42, Iss. 2; p. 42, downloaded form Dialog Web on Mar. 25, 2009, 10 pages.\*

\* cited by examiner

*Primary Examiner*—James Zurita
(74) *Attorney, Agent, or Firm*—Ostrolenk Faber LLP

(57) ABSTRACT

A method for fitting clothing based on the body dimensions of an individual is disclosed. The method comprising the steps of (a) Establishing standard body dimensions and ratios for a given garment style.
(b) Choosing a try-on size and style that comes closest to an individual's preferences
(c) obtaining information from the individual with regard to the personal style and fit preferences of the individual;
(d) scanning the individual to establish his or her body dimensions and ratios; and
(e) creating alterations to the pattern of the chosen try-on size and style based on a comparison of the individual's body dimensions and ratios to the standard body dimensions and ratios for that style and incorporating the information regarding the individuals personal style and fit preferences.

14 Claims, 13 Drawing Sheets

Figure 8

New Overarm

Set up horizontal plane at back of arm point.

BOA Blade

BOA Ratios

Figure 9

SYSTEM AND METHOD FOR FITTING CLOTHING

FIELD OF THE INVENTION

This invention relates generally to a system and method for fitting clothing based on the body dimensions of an individual, and in particular to a system and method of obtaining and analyzing information about an individual's body, personal style and fit preferences so that clothing for that individual can be selected and/or manufactured.

BACKGROUND OF THE INVENTION

One of the biggest problems facing the retail clothing industry is achieving proper fit for a garment, and the costs associated with realizing this fit. This problems embraces both the custom made or fitted apparel markets, as well as ready-made or so called "off the rack" garments.

One of the most significant costs realized by the retail ready-made clothing industry is the return of merchandise due to improper fit. Many factors can be said to contribute to this problems, including the fact that many customers do not know their size in a particular manufacturer's clothing line, and most manufacturers have developed their own systems for sizing. Accordingly, to achieve a somewhat proper fit, customers shopping at typical brick and mortal retail establishments often try on three or four different size garments from a given manufacturer's clothing line to determine which size fits their body properly. This is both time consuming and frustrating. For the mail order catalog, internet, and home shopping industry, where customer's do not have the benefit of trying on multiple garments, returns are one of the biggest drawbacks of selling fashions. A detailed description of the problems associated with retail sales of off the rack clothing is further described in U.S. Pat. No. 5,930,769 issued to Rose on Jul. 27, 1999 for a System and Method for Fashion Shopping.

As previously mentioned, it is time consuming and costly, both to the consumer and clothing manufacturer to achieve the proper fit for clothing purchased "off the rack". In fact, it is very rare for the nearest standardized size of an article of clothing for sale from the rack to fit properly. One survey, cited in U.S. Pat. No. 5,548,519, issued to Sung K. Park on Aug. 20, 1996, for a custom apparel manufacturing apparatus and method, found that only two percent of the population is correctly fitted by an available standard sized article of clothing without any alteration. Consequently, any expense saved by purchasing mass produced clothing at a lower cost than custom tailored clothing is partially lost when a seamstress or tailor is paid to make alterations to the article of clothing. Other costs and problems associated with purchasing ready-made clothing for further alteration is described in U.S. Pat. No. 5,956,525, issued to Minsky on Sep. 21, 1999 for a Method of Measuring Body Measurements for Custom Apparel Manufacturing.

Similarly, a basic problem in making fitted apparel in a cost effective manufacturing system has been determining how to capture a person's body dimensions so that a piece of clothing can be constructed to fit the customer well, without undue expense for the manufacturer, retailer or consumer.

There are currently several methods being used to obtain information about an individual's body, personal style and fit preferences so that custom made clothing for that individual can be manufactured.

The "Custom" Method

The Custom Method involves a highly skilled and trained tailor thoroughly measuring the individual's body dimensions with a vinyl tape measure and determining the individual's posture and shoulder angles by eye. The tailor determines the individual's style preferences by either showing him or her drawings from a "style book", or clothing that the tailor has produced for other individuals. The individual's fit preferences are usually determined by asking the individual whether he or she prefers his or her clothing "tight, lose, or average". Also, the tailor might examine the garment the individual is wearing and ask if its fit is satisfactory. The tailor might then take dimensions from that garment.

Using this information, the tailor then drafts a first pattern by hand for that particular individual on inexpensive fabric, often called "muslin", which he would fit on the individual at a later date. Based on this fitting, the tailor then makes a second paper pattern by hand, from which the individual's actual cloth would be cut. Usually this garment is only partially sewn when the customer returns for another fitting and further corrections to the pattern are made. The process can be repeated 4 or 5 more times until the garment is completed.

Although the custom method results in some of the best fitting garments, there are several deficiencies associated with this method. First, the tailor must be of the highest skill possible to accurately obtain the necessary measurements. Few tailors today are trained as true custom tailors and possess this skill. In addition, there are far fewer custom tailors today than in the past, with most custom tailors being in there 70's and 80's.

Another deficiency with the custom method involves the consistency, or inconsistency in measurements. Even skilled tailors measure individuals inconsistently, either by varying where they place their tape on the individual's body or how tight they hold the tape each time. This inconsistency oftentimes leads to unnecessary additional fittings.

The custom fitting process is also quite lengthy, taking from 2-4 months to produce a man's suit. Several factors may contribute to this deficiency, including the trial and error inherent in the custom fitting process, and the limitations on the tailor's time if he or she has many customers.

In addition, because the custom tailor is rarely a trained designer, he or she usually has a "house" style. As a consequence, most garments produced look similar with the exception of detailing.

Finally, quality custom clothing is very expensive. A man's suit produced from superior material can cost between $4,000 and $8,000.

The "Made-To-Measure" Method

Another method used to obtain information about an individual's body, personal style and fit preferences so that custom made clothing for that individual can be manufactured is the made-to-measure method. In this method, a skilled and trained tailor measures an individual's body dimensions with a vinyl tape measure, but less thoroughly than in the custom made scenario because the tailor is only trying to determine an approximate size for a garment for the individual to try on. The tailor must have a selection of ready-made garments on hand and he or she uses his or her knowledge of this inventory to select an appropriate "try-on" garment. From this try-on, the tailor determines a style and fit preferences by questioning the individual about his or her satisfaction with the try-on. If necessary, the tailor may select another size or style garment for the individual to try on. An advantage of made-to-measure over custom made garments is the ability to offer garments in a multiple of styles.

The tailor then uses the garment that comes closest to the individual's size, style and fit preferences as a basis to analyze what changes need to be made to create a better fit. The tailor will then examine the garment for incongruities from what he or she considers a good fit. Posture and shoulder angles are analyzed only if the garment is showing incongruities from a proper fit in those areas. The tailor must also determine from experience how much of a change needs to be made to correct the incongruity. The tailor then make notes of these corrections that are then transmitted to a clothing factory. Based on the tailor's notes, the garment factory will alter a standard pattern in the size and style of the try-on to correct the fit incongruities that the tailor observed. These alterations to the standard pattern may be done by hand or, more typically, in a CAD/CAM system.

The garment usually arrives from the factory in a completed or near-completed state for a fitting on the individual. The tailor will then pin or chalk any alterations that need to be made on the garment. Typically, the process involves fewer fittings then in the custom method. A made-to-measure garment usually costs half the amount of a custom one because more standardized processes are involved.

Like the custom method, there are several deficiencies presented by the made-to-measure method. First, the tailor must have a very high skill level. He or she must have a keen eye for diagnosing the fit incongruities based on the try-on garment. In many cases a try-on garment may bulge or show tightness that can originate from more than one source. For example, a ripple may appear below an individual's neck at the back of a coat because the individual's shoulders are square or because a coat is tight across the back. Depending on the tailor's diagnosis, a different alteration to the individual's pattern will result.

Secondly, there can also be false positives, in other words, instances where a try-on garment does not exhibit a fit problem but in fact one does exist. These false positives can be created by a variety of factors including the fabric of the try-on accommodating the problem, where the fabric that will actually be used in making the made-to-measure garment will not.

In addition the tailor must have the skill to know which alterations not to do. For example, a man with an extremely low right shoulder should not have the shoulder lowered to the full extent necessary because he will look too lopsided. Instead, the shoulder should be lowered half the amount and a thicker shoulder pad should make up the difference.

Finally, there must be a try-on in the customer's approximate size or the process does not work.

The "Body Scan" Method

This new and so far unproven method attempts to do away with the skilled tailor by using body-scanning machines. In concept, the body scanner is located in a retail store or shopping mall for the use of several stores. The individual stands on a platform in a state of undress, usually in a tight-fitting body suit. Although there are different types of body scanners, the goal is to obtain accurate and complete body measurements, including posture and shoulder angles. Typically, no try-on garment is used as a basis for finding fit incongruities or to obtain an individual's feedback. The individual has simply selected a preferred style within the store or from a catalog. At this point, the body scan method is very much like the custom method except no skilled tailor is involved. However, unlike the custom method, the individual's body scan measurements are turned over to a computer program for analysis. The program compares the individual's measurements to the actual pattern measurements of the garment style the individual prefers. In theory, the computer's analysis would result in a modified pattern that would fit the individual perfectly. The pricing for this process is, as yet, unknown.

Similar to the other methods, there are distinct deficiencies associated with the body scan method. First, the body scan process is still unproven. Although the process may work in theory, the results obtained in actual use have been uncertain at best.

Second, the process requires knowing the dimensions of every pattern piece in every size, since the measurements taken by the body scan will be compared to the dimensions of the each pattern piece. For example, the body scan dimensions of a customer's thigh will be compared to the dimensions of the pattern pieces of the trouser which make up the thigh area. To make this comparison, the dimensions of each pattern piece for the thigh must be known. In addition, the process requires knowing the allowance for air space or comfort for every pattern piece over the individual's actual body dimensions. These factors are usually what define a garment's style and any miscalculation may result in a loss of style. These problem will be particularly acute with loose fitting clothing. The tight fitting body suits worn by the individuals during the body scan are also a source of inaccuracy. These suits are made from a resilient material, such as spandex or lycra, and act as a girdle on the scanned individual. This results in scanned measurements that are smaller than the actual dimensions of the individual. In addition, many of the readings from the body scan must be interpreted. For example, a man's waist might measure 42 inches, but larger size waists usually compress and the man would actually take a 41 inch waist trouser.

Another deficiency inherent with the body scan method is that fit and style preferences can only be determined through conversations with the individual, since the individuals measurements are being taken virtually. This rather nebulous method, without more, makes it difficult for the scanned individual to express exactly what fit and style they desire. For example, the only way to determine how the scanned individual would like the garment to fit is by posing the question to the individual. The individual does not have the benefit of trying on a garment and saying they would like the arm length longer or shorter, or the waist tighter or looser. Similarly, style preferences may be determined only from showing the individual photographs or sample garments not necessarily in his or her size.

Finally, in some cases the literal translation of measurements from a body scan to a pattern will create an unattractive effect. For example, if an individual has a small waist and a large seat, it will make the individual look pear-shaped if the waist is taken in to the extent of the body scan measurements.

In addition, there are efforts underway to use body scanners to predict a customer's size for ready-made clothing. These efforts are based on comparing the customer's body scan with pattern dimensions for the ready made clothing. As explained above in the section on making custom clothing, this is a flawed concept.

What is need is a system and method that will make the creation of custom clothing less dependent on the skill of traditionally trained tailors.

What is further needed is a system and method that will provide consumer with clothing that meets their expectation of style and fit without the need for expensive fitting by a trained tailor.

Another need is for a system and method that may incorporate new technologies, such as the body scan method, with the knowledge and skill of trained professional tailors so that clothing for that individual can be selected and/or manufactured.

What is further needed is a system and method to obtain information about an individual's body, personal style and fit preferences so that clothing for that individual can be selected and/or manufactured.

SUMMARY OF THE INVENTION

It is an object of the present invention to incorporate and improve upon the most effective elements of the custom, made-to-measure and body scan methods.

It is a further object of the present invention to make the creation of custom clothing less dependent on the skills of traditionally trained tailors while providing consumers with clothing that meets their expectations of style and fit.

The present invention discloses a method for fitting clothing based on the body dimensions of an individual. The standard body dimensions and ratios for a customer are determined for a given garment style. A try-on garment is then chosen that is similar in size and style, and comes closest to the customer's preferences. Information is obtained from the customer with regard to the personal style and fit preferences of the customer. This information is generally obtained before the try-on garment is selected, however, additional information is obtained from the customer through a series of questions after the try-on size has been established. The customer is scanned using a body scanner or similar means to establish the customer's body dimensions and ratios. The pattern of the chosen try-on garment size and style is then altered based on a comparison of the customer's body dimensions and ratios to the standard body dimensions and ratios for that style garment, and incorporating the information regarding the customer's personal style and fit preferences.

BRIEF DESCRIPTION OF THE DRAWINGS

FIG. 8 is a diagrammatic representation showing the horizontal plane used to obtain the B of Arm Blade and Back of Arm Chest measurements according to one embodiment of the present invention.

FIG. 9 is a diagrammatic representation showing the vertical plane used to obtain the B of Arm Blade and Back of Arm Chest measurements according to one embodiment of the present invention.

DETAILED DESCRIPTION OF THE INVENTION

Figure 1:
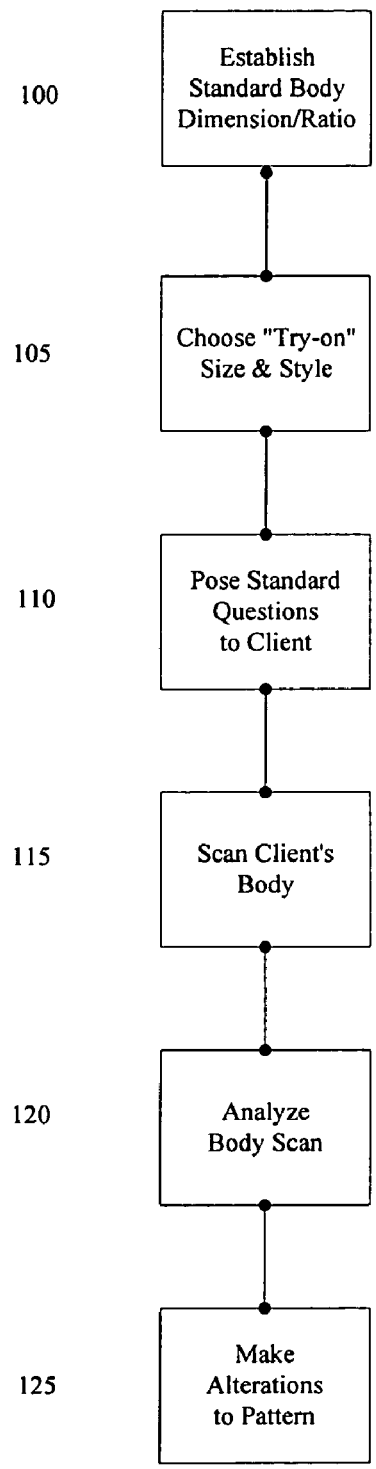
FIG. 1 shows a flow chart illustrating the steps to obtain and analyze information about an individual's body, personal style and fit preferences so that clothing for that individual can be manufactured according to one embodiment of the present invention.

The present system and method is created by reducing the knowledge of skilled tailors to simple formulas and then combining these formulas with new technology—a body scan. By employing this methodology, the instant system and method avoids the deficiencies of the custom method, made-to-measure method and body scan methods previously described.

A body scan of the individual or customer is taken using a body scanner. In one embodiment of the invention, the body scanner is an apparatus that uses high-resolution scanners to capture the shape of the human body with a scan of eye-safe laser light emanating from a plurality of scanning heads. A person wearing a body suit or underwear steps into a booth and is scanned using ordinary light. The person stands in front of a banded light source and cameras read the alternating bands of light and dark from different angles. The curves provide data on height and weight, but not depth. Software residing on a computer is then used to extrapolate the person's depth (or thickness), and finally the three-dimensional information is obtained. The use of body scanners to measure an individuals body dimensions is well known in the art.

By using a body scanner in conjunction with the inventive system and method, numerous shortcomings of the previously described prior art methods are overcome without sacrificing some of the more desirable features. For example, the present invention avoids the inconsistencies associated with tailor measurements that occur in the custom method, but retains the step of a sample try-on found in the made-to-measure method. This affords the consumer the opportunity to give meaningful feedback on style and fit yet avoids the trial and error, time-consuming and costly procedures indicative of the custom made method. In addition, this system and method differs from the made-to-measure method by providing the added feature of allowing the try-on procedure to be conducted by a non-technically proficient worker who only needs to elicit some basic information from the consumer. Most clothing salespeople can perform this function.

As described earlier, the present system and method allows the consumer to try-on sample garments, giving them the opportunity to choose from a wide range of styles and makers, not just the "house" of the designer or tailor. However, the present invention does not require the tailor to diagnose fit incongruities discovered during the try-on. The incongruities will be diagnosed through a standardized analysis of the consumer's anatomy derived from the body scan. This decreases the chance of misdiagnosis and false positives found with the made-to measure method because the consumer's actual anatomy will be analyzed, not its effect on a try-on garment.

As previously stated, the present system and method uses a body scanner to establish the clothing customer's individual body dimensions and ratios. This differs from previous applications of a body scanner to fit a consumer for custom made or ready to wear apparel. One key difference is that the present invention compares the consumer's body scan to standard body dimensions and ratios that have been establish for each style, instead of garment pattern dimensions.

Turning now to FIG. 1, a flow chart is shown illustrating the steps to obtain and analyze information about an individual's body, personal style and fit preferences so that clothing for that individual can be manufactured according to one embodiment of the present invention. Although the present embodiment describes the measurements and rules for fitting the customer with a jacket (coat), this method may also be applied to other garments and apparel, for example trousers, shirts, blouses and sweaters.

The first step in the process is to establish standard body dimensions and ratios for a given garment style as shown in step 100. This step only needs to be performed once for each garment style. If the basic silhouette of a style is the same as another style, the standard body dimensions and ratios will work for both styles. An individual analysis is only required when a garment has a different silhouette. By way of example, in the case of traditionally tailored men's clothing or shirts, the silhouettes may vary very little. Therefore, this step need only be used for non-traditional men's garments and women's garments.

Figure 2:
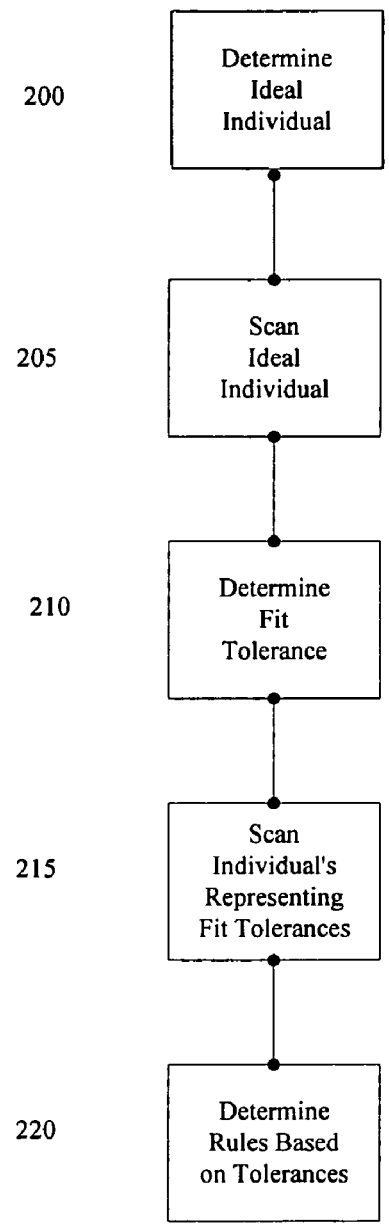
FIG. 2 shows a flow chart illustrating the steps of establishing standard body dimensions and ratios for a given garment style according to one embodiment of the invention.

The process of establishing standard body dimensions and ratios for a given garment style according to one embodiment of the invention is further described in FIG. 2. This process begins by finding an individual who fits the garment style properly, i.e. the ideal individual as shown in step 200. It does not matter which size this individual fits properly. In one embodiment of the invention, proper fit will be determined by either the garment's designer or retail store personnel familiar with clothing of this type. While this process is somewhat subjective, it is one that cannot be replaced by a technological analysis, such as the body scan method described in the prior art. These prior art systems attempt to accomplish this task through comparisons of dimensions, but an aesthetic evaluation is necessary in order to maintain the spirit of the clothing designer's vision. Once the ideal individual is found, he or she must be scanned to determine his or her body dimensions and ratios as shown in step 205.

The next step in the process of establishing standard body dimensions and ratios for a given garment is to determine the fit tolerance for a given style as shown in step 210. To establish fit tolerance, one or more individuals are found that are close in size to the ideal individual, but smaller or larger in certain key areas-usually, top girth, waist, and seat.

In one embodiment of the invention a total of five individuals meeting this requirement are used. These individuals try on the same size and style garment, as did the ideal individual, and a determination is made as to whether the fit is acceptable. In one embodiment of the invention, this determination is made by the designer or store personnel. This analysis will help determine the fit tolerances of a given style. Loose fitting clothing will have more tolerance than tight fitting clothing. These individuals must also be body scanned and their measurements and ratios noted as shown in step 215.

A set of rules is then constructed based on the tolerances established and the variations in body scans for the ideal individual and individuals representing the fit tolerances as shown in step 220. Once these rules are established, a try-on size and style that comes closest to an individuals preference can be selected.

Turning back to FIG. 1, the selection of a try-on size and style that comes closest to an individuals preference is made as shown in step 105. This step would typically take place in a retail store. In one embodiment of the invention, a salesperson would help an individual find the style that he or she prefers. A size for the garment that come closest to fitting the individual—even if the fit is poor—is determined.

The salesperson then asks a couple of simple questions, as shown in step 110, to determine the customer's comfort with the garment. The response to these questions, as well as the try-on style and size are noted, preferably on a form. The following inquiries represent example questions that may be posed to the customer:

Where, if any place, does the garment feel tight?
Where, if any place, does the garment feel loose?
Does the garment feel tight under the arms?
Does the garment feel tight when you move your arms forward?
(For trousers) At what height do you wear your trousers?
What is your preferred length of coat or skirt?

A body scan of the customer is then taken to establish his or her body dimensions as shown in step 115. In one embodiment of the invention, at least two body scans are taken, each with the customer posing in a different position. Illustrations showing the two posed positions for the customer during the body scans, i.e. Scan 1 and Scan 2 respectively, are shown in FIGS. 3 and 4.

Figure 3:
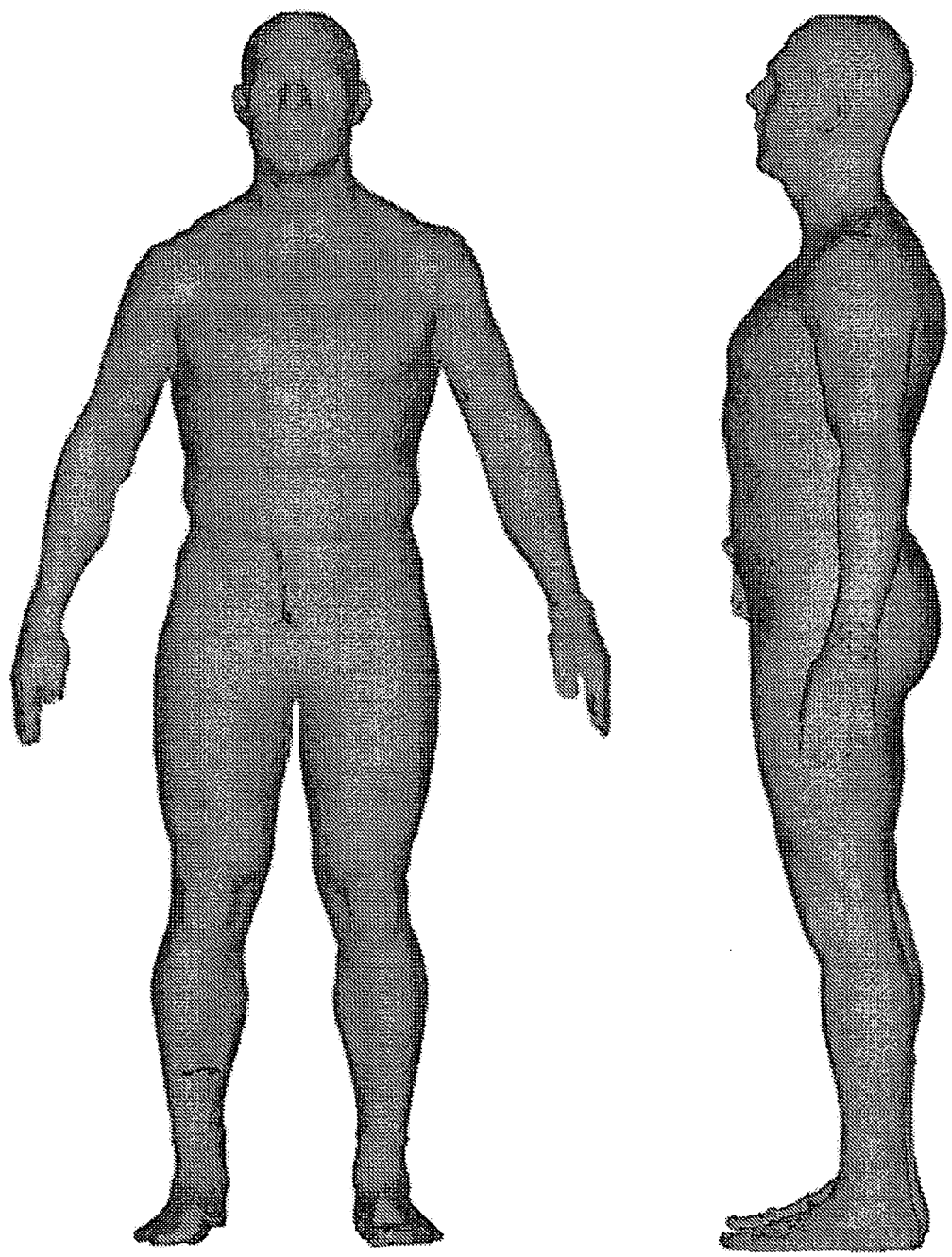
FIG. 3 is a diagrammatic representation showing a posed positions for the customer during the body scan according to one embodiment of the present invention.

For the first pose—Scan 1—shown in FIG. 3, the customer's arms are spread approximately twelve inches from the body with the feet placed approximately twelve inches apart. The purpose of this scan is to provide unobstructed access to the customer's waist and armpits for measurements. In one embodiment of the invention, the measurements are taken of the customer's scanned image using a computer system. The arms should be kept parallel to the customer's sides so as not to cause a shadow distortion on the body. If the customer is overweight, it may be necessary for him to raise his arms higher. If the customer is obese, it may be necessary for him to raise his arms so high that they are out of the body scanner's scanning range or "scan zone".

Figure 4:
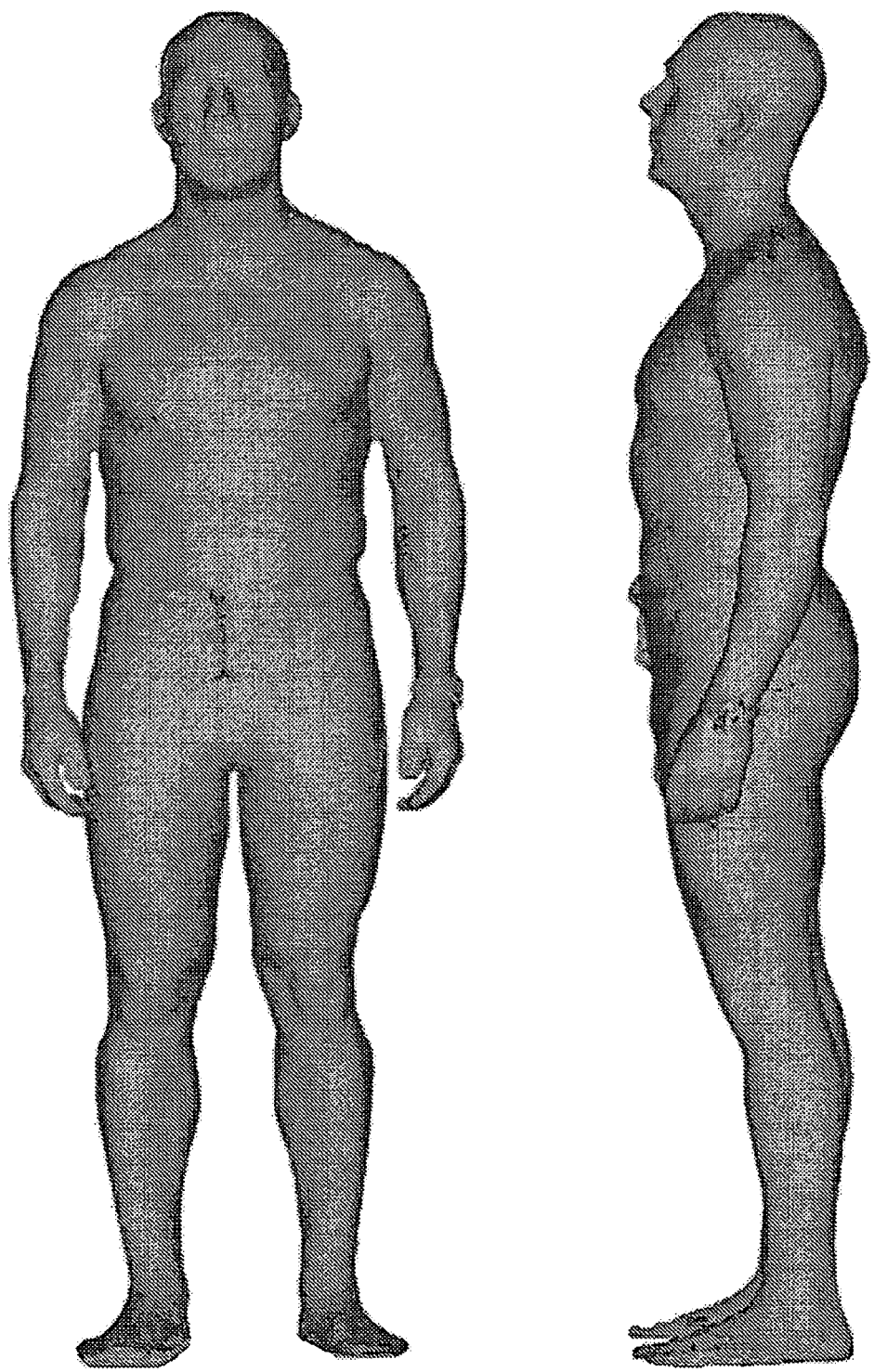
FIG. 4 is a diagrammatic representation showing a posed positions for the customer during the body scan according to one embodiment of the present invention.

The second pose—Scan 2—captures the customer's natural posture and is shown in FIG. 4. When taking a body scan in this pose, the customer stands as he or she would under normal circumstances, with feet placed approximately 12 inches apart. This pose allows for measurements to be taken from the scanned image for virtually all but the waist and armpit locations. Alternatively, the customer may stand in the manner that he wishes to project his or her clothing.

When performing these scans, care must be taken so that any false positives that occur due to the customer's posture or pose in Scan 1 will be detected in Scan 2. In addition, if the customer seems to be sucking in his stomach or puffing up his chest in Scan 1, but not Scan 2, it may be advisable to take another Scan 1. It is also important that the customer not raise his arms higher than necessary, as this may affect the critical shoulder angle measurement.

Turning again to FIG. 1, once the client's body scans have been taken, the scanned images are analyzed. This process comprises the application of a set of rules to measurements taken from the client's body scan. The rules are developed based on the style, fit and tolerances of the client selected garment on the ideal individual as depicted in FIG. 2. The analysis thus comprises a comparison of the client's body scan to standard body dimensions and ratios—the body scan of the ideal individual—which has been established for each style of garment. Once the rules are applied to the client's body scan, a condition regarding the client's fit may be determined. Alternation to the pattern of selected try-on garment size and style based on the comparison can be determined as shown in step 125. In one embodiment of the invention, the alteration is based on a comparison of the customer's body dimensions and ratios to the standard body dimensions and ratios, i.e. the ideal individual, for that style garment and the customer's answers to the question posed in step 110.

In one embodiment of the invention, the analysis of the scanned images are performed by a computer system. In other embodiments of the invention, the analysis of the scanned images are performed manually by a trained individual. In still further embodiments of the invention, the analysis of the scanned images are performed by a trained individual with the assistance of a computer system.

Figure 5:
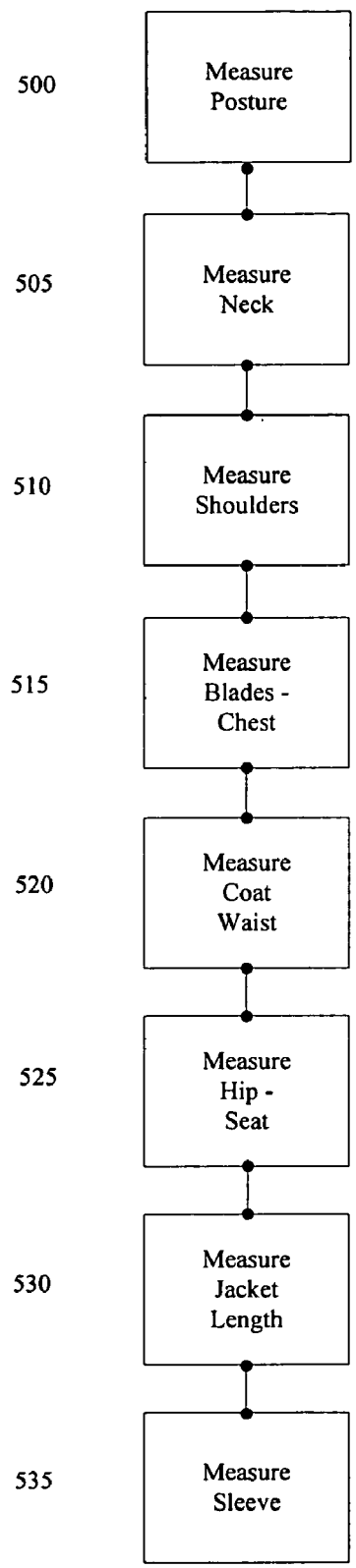
FIG. 5 shows a flow chart illustrating the application of the rules for analyzing the customer's body scan according to one embodiment of the present invention.

A flow chart showing the application of the rules for analyzing the customer's body scan according to one embodiment of the present invention is shown in FIG. 5. To apply the rules to the body scan, measurements of the customer are taken off the customer's body scan. These measurements are typically taken off the customer's Scan 2, unless a clear measurement involving the waist or armpits is desired. In these instances, the customer's Scan 1 may be used to obtain unobstructed measurements. Once the measurements are obtained the measured value is used to determine a customer's condition or category with regard to a particular measured characteristic.

Figure 6:
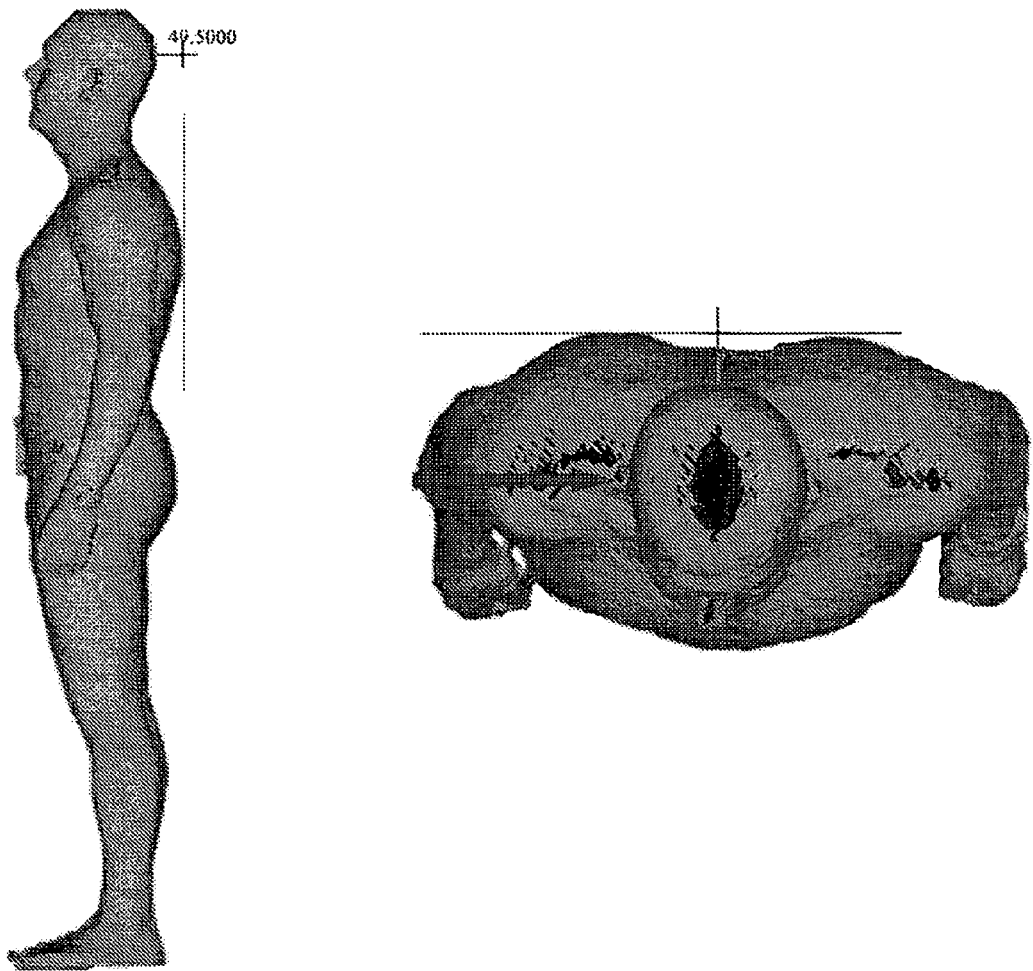
FIG. 6 is a diagrammatic representation showing the posture measurement according to one embodiment of the present invention.

As shown in step 500 the customer's posture is measured off the body scan. The posture measurement is obtained by taking the horizontal measurement between the shoulder blade plane ("blade plane") and the widest part of the skull. A diagrammatic representation showing this measurement according to one embodiment of the present invention is shown in FIG. 6. Once this measurement is determined any correction to the pattern of the chosen try-on garment may be determined. For the purpose of example, a table illustrating the measured valued and determined condition and alteration requirements is as follows:

| MEASURED VALUE (cm) | CONDITION | ALTERATION |
|---|---|---|
| 1 | Extreme Erect | Erect ⅜" |
| 3.5 | Erect | Erect ¼" |
| 5 | Slight Erect | Lower Collar ¼" |
| 6 | Normal | — |
| 6.5 | Slight Head Forward | Curve In ⅛" |
| 7 | Head Forward | Head Forward ¼" |
| 8 | Stoop | Stoop ⅜" |
| 10 | Extreme Stoop | Stoop ⅝" |

As can be seen from the table, the normal value for the posture measurement is 6 centimeters. For values lower than 6 cm, the customer's posture is considered erect, and appropriate alterations must be made. Similarly, measured values greater than 6 cm indicates that the customer's posture is stooped, and appropriate alterations to account for this condition must be made. The terms associated with the alterations i.e. "Erect ⅜" or "Curve In ⅛" etc. are standard terms used by tailors in the garment industry to describe the alterations. As such, they are well known to one of ordinary skill in the art and need not be defined herein.

Figure 7:
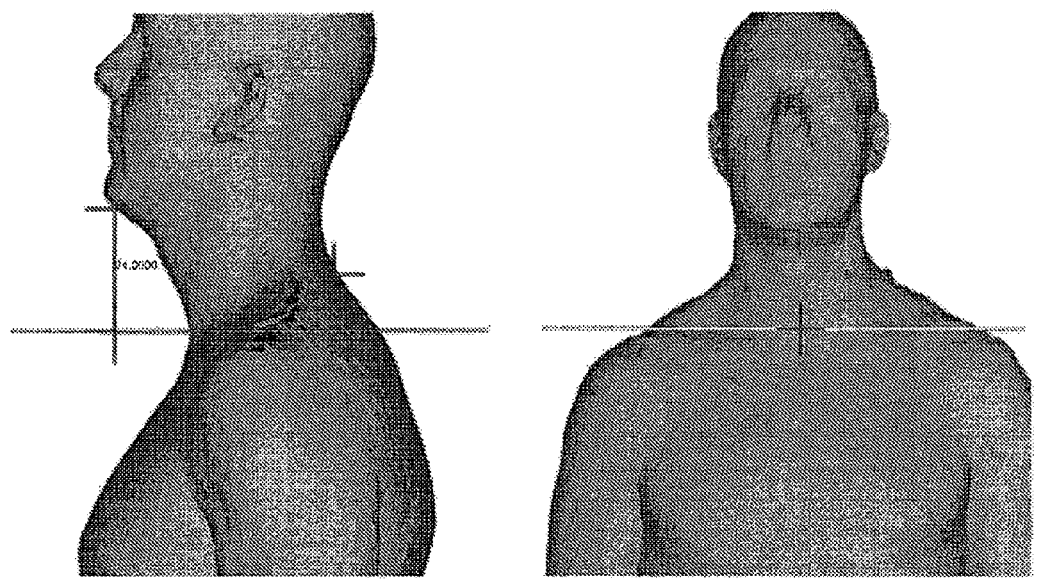
FIG. 7 is a diagrammatic representation showing the neck measurement according to one embodiment of the present invention.

The next customer measurement taken is the neck as shown in step 505. The neck measurement is obtained by measuring the distance, in the vertical plane, from the neck dimple to the lowest part of the chin. A diagrammatic representation of this measurement according to one embodiment of the present invention is shown in FIG. 7.

As previously described, once this measurement is determined any correction to the pattern of the chosen try-on garment may be determined. For the purpose of example, a table illustrating the measured valued and determined condition and alteration requirements is as follows:

| MEASURED VALUE (cm) | CONDITION | ALTERATION |
|---|---|---|
| 4.5 | Short | Shorten Strap ⅜" |
| 6.5 | Normal | — |
| 8.5 | Long | Lengthen Strap ⅜"<br>Do not slope shoulders more than ¼"<br>Do not use if stooped<br>Do not use if Chest is reduced |

As described earlier, the terms associated with the alterations are standard terms used by tailors in the garment industry to describe the alterations.

Once the neck is measured, the shoulders are analyzed as shown in step 510. In one embodiment of the invention, the shoulder measurements determine the angle, in degrees, between a point on the shoulder determined by rotating a plane from the top of the individual's armpit through the shoulder, to a point at the base of the neck. The normal shoulder measurement is 25 degrees. As previously described, once this measurement is determined any correction to the pattern of the chosen try-on garment may be determined. For the purpose of example, a table (Shoulder Table 1) illustrating the measured valued and determined condition and alteration requirements is as follows:

| VALUE (DEGREES) | CONDITION | ALTERATION |
|---|---|---|
| 20 | Extreme Square | Square ½"<br>Shorten Strap ⅜" |
| 21 | Very Square | Square ½" |
| 23 | Square | Square ⅜" |
| 24 | Semi-Square | Square ¼" |
| 25 | Normal | — |
| 26 | Semi-Sloping | Slope ¼" |
| 27 | Sloping | Slope ⅜" |
| 29 | Very Sloping | Slope ½" |
| 30 | Extreme Sloping | Slope ¾" |

As described earlier, the terms associated with the alterations are standard terms used by tailors in the garment industry to describe the alterations.

In addition to the shoulder alterations described above, additional tailoring problems may be encountered caused by a lack of symmetry between the customer's shoulders. These problems may be resolved by applying some additional rules.

By way of example, if one shoulder is lower than the other and both shoulders are sloping, a measurement should be taken to ascertain the difference in slope between the two shoulders. Once determined, the lower shoulder should be sloped and treated as low according to the following table (Shoulder Table 2):

| VALUE (degrees) between shoulders | CONDITION | ALTERATION |
|---|---|---|
| 0 | Normal | — |
| 2 | Semi - Low | Slope ¼" |
| 3 | Low | Slope ⅜" |
| 4 | Very Low | Slope ½" |

Similarly, if one shoulder is lower than the other and both shoulders are square (i.e. one shoulder is "squarer" that the other), or one shoulder is square and the other is normal, a measurement should be taken to ascertain the difference in "square-ness" between the two shoulders. Once determined, an alteration should be made to the lesser square shoulder's degree. In addition, the alterations should be made according to the following table (Shoulder Table 3):

| VALUE (degrees) Difference between the two shoulders | CONDITION | ALTERATION |
|---|---|---|
| 0 | Normal | — |
| −2 | Semi - Square | Shorten Strap ¼" |
| −3 | Square | Shorten Strap ¼" |
| −4 | Very Square | Shorten Strap ¼" Raise higher shoulder ¼" |

Finally, if one should is square and the other is sloped, the square shoulder should be squared according to Shoulder Table 3 and the sloped shoulder should be lowered according to this same table.

Once the shoulders have been measured and analyzed, the shoulder blades and chest are measured as shown in step 515. This step requires the collection and analysis of several different measurements. In one embodiment of the invention, an Over-arm Girth, Top Girth, Back-of-Arm ("BOA") to Shoulder Blade ("BOA Blade") and BOA to Chest ("BOA Chest") measurements are taken and analyzed to determine the necessary alterations to the upper torso. These measurement for the shoulder blade/chest are considered over-arm measurements that replaces the over-nipple over-arm measurements used in traditional tailoring.

The Over-arm Girth measurement is the circumference of the customer's torso and arms. With the arms placed at the customer's sides, a circumferential measurement is taken around the body (torso and arms) at the bicep level. Similarly, the Top Girth measurement is the circumference of the customer's torso only. With the arms place at the customer's sides, a circumferential measurement is taken around the customer's body (torso only) at the nipple level.

The BOA blade and BOA chest measurements require a more complicated procedure. To obtain these measurements a horizontal plane extending from the top of the armpit is identified. A diagrammatic representation showing the location of this horizontal plane according to one embodiment of the present invention is shown in FIG. 8. A vertical plane is then identified that extends from a point on the horizontal place that intersects with the back of the customer's arm. A diagrammatic representation showing the location of this vertical plane according to one embodiment of the invention is shown in FIG. 9. A series of measurements may be taken from this vertical plane that are used to determine the alterations to the garment. In one embodiment of the invention, the BOA chest measurement is taken by determining the horizontal distance from the chest at the nipple line to the vertical place. This measurement is illustrated in FIG. 9. Similarly, the BOA blade measurement is taken by determining the horizontal distance from the vertical plane to the shoulder blades.

The measurements for the Over-arm Girth, Top Girth, BOA Blade, and BOA Chest measurements are then analyzed individually and in combination to determine the customer's physical "condition" an any alterations that may be required.

In one embodiment of the invention, the alterations to the customer's shoulder blade measurements may be made according to the following rules. If the customer's BOA Blade to Top Girth ratio (BOA Blade/Top Girth) is less than 0.04, the customer is considered to have small shoulder blades. For such a condition, the blades measurement should be altered for a reduction of ¼" for every hundredth the ratio is below 0.04. One exception to this rule would be if the customer's size is the same or greater than the Top Girth measurement.

Similarly, if the Over-arm Girths to Top Girth ratio is less than or equal to 1.13, and the BOA Blade/Top Girth ratios is greater than 0.06, the customer is considered to have large shoulder blades. For such a condition, the blades measurement should be altered to increase the pattern in the blade area by ¼". In addition, if the Top Girth measurement is greater than the try on coat size selected, ¼"-⅜" should be added to the side body and under sleeve measurements. If the Top Girth measurement is greater than or equal to the try-on oat size selected, and the customer is showing a stoop, the center seam of the garment should be curved ⅛".

In addition, where the Over-Arm to Top Girth ratio is less than 1.10, a smaller point to point measurement should be given than the Top Girth would indicate. The point to point measurement is a standard industry measurement of the width of a coat across the shoulders. Technically, the point to point measurement provides the dimension from the pattern notch at one sleeve across the back to the notch at the other sleeve. The pattern is altered by increasing or decreasing this dimension.

If the Over-Arm to Top Girth ratio is greater than 1.20, a larger point to point measurement should be given than the Top Girth would indicate.

As described above for the customer's shoulder blade measurements, the customer's chest measurement may be altered in another embodiment of the invention according to another set of rules. By way of example, it the BOA Chest to BOA Blade ratio is greater than 5, ¼" must be added to the chest measurement, unless the measured chest size is the same or greater than the Top Girth measurement. If the BOA Chest to BOA Blade ratio is less than 3, the chest measurement must be reduced by ¼", unless the chest size is the same as, or less than the Top Girth measurement. If the BOA Blade ratio is greater than 6, a chest dart must be added. A chest dart is an industry standard term for a cut, approximately three inches long, which is placed in the pattern so that more shape is created in the chest area when the edges of the cut are sewn together.

Similarly, if the BOA Chest to Top Girth ratio is greater than 0.23, the breakline must be moved ¼". The breakline is the line running from the top of the shoulder to the top button of the coat directly under the collar and lapel. By moving the breakline forward (away from the armhole), more chest is created.

Once the shoulder blades and chest have been measured and determined, the coat waist is measured and analyzed and shown in step 520. Typically, the normal coat waist measurement is 2 inches less than the coat sized. If the coat waist is more than 2 inches less than coat size, the customer is said to have a "Small Coat Waist". If such a condition exists, the front and sides of the coat waist should be reduced the exact amount of the difference, i.e. the exact amount of the difference between the coat waist and coat size. For example, if the customer's coat waist measurement is 37" and the customer's coat size is a 40 (40"), the front and sides of the coat should be reduced 3 inches.

If on the other hand it is found that the customer's coat waist is less than 2 inches below the coat size, a determination must be made as to location that the customer carries his weight (size). This assessment will ultimately determine if the customer is classified as having a pot belly or portly physique.

Figure 10:
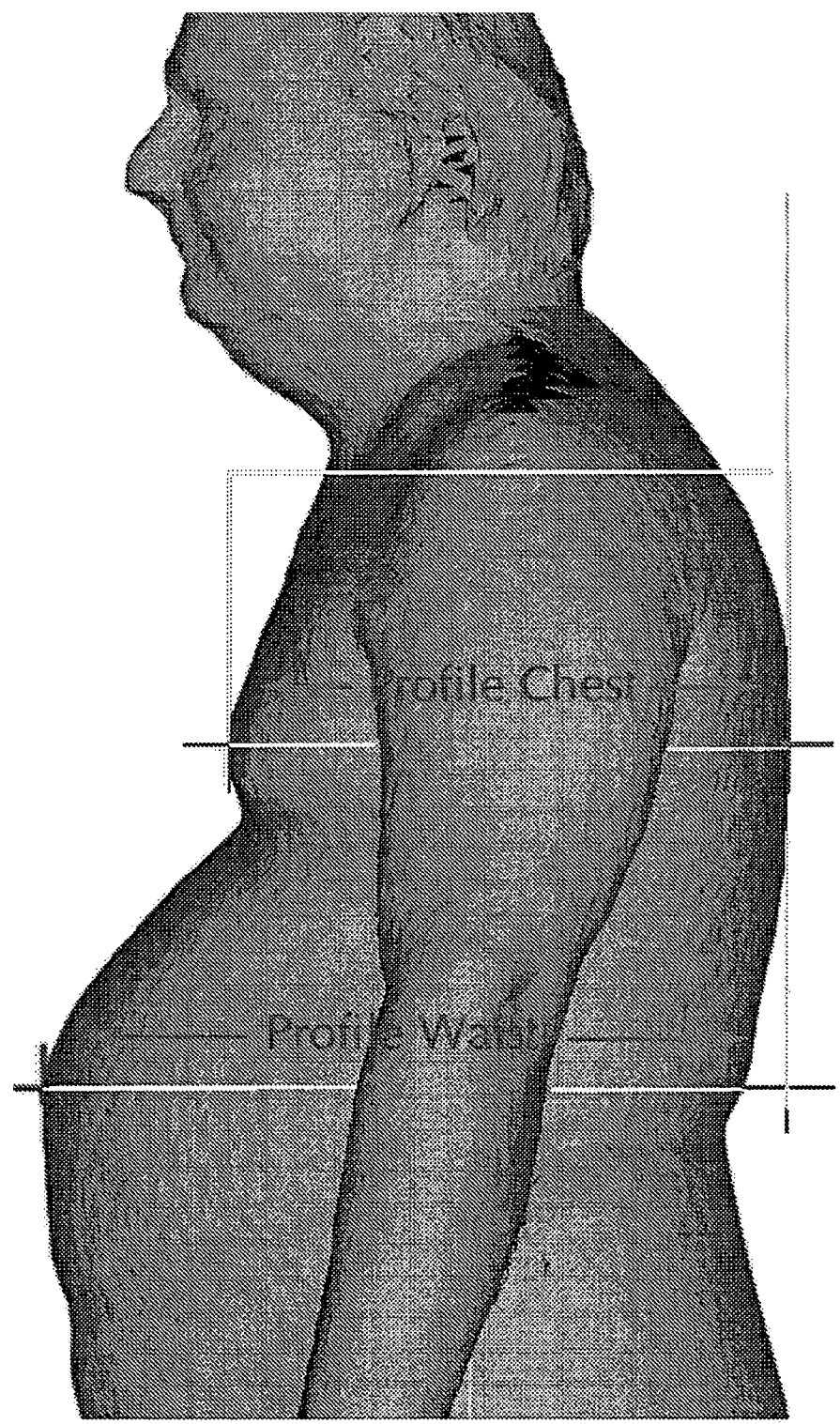
FIG. 10 is a diagrammatic representation showing the vertical reference plane used to obtain the Profile Chest and Profile Waist measurements according to one embodiment of the present invention.

In one embodiment of the invention, measurements of the customer's chest profile (Profile Chest) and waist profile (Profile Waist) are taken and analyzed to assist in this determination. In such an embodiment, the Profile Chest and Profile Waist measurements are taken from a vertical reference plane established at the customer's shoulder blade as shown in FIG. 10. As illustrated in this figure, the Profile Chest measurement is the horizontal distance between the reference plane and the customer's nipple line. Similarly, the Profile Waist measurement is the horizontal distance between the reference plane and the customer bellybutton.

Once these measurements are obtained, the dimensions are analyzed to determine the alterations, if any, that must be made to the customer's garment. Generally, a Profile Chest to Profile Waist ratio of between 1.10 and 1.12 is considered normal. No alternations are generally required for a normal ratio. If the Profile Waist to Profile Chest radio is greater that 1.12, but less than 1.20, the customer is considered to have a pot belly. In this scenario, half of the alteration should be added to the front of the customer's garment, and the other half to the sides of the garment. If the Profile Waist to Profile Chest ratio is greater than 1.20, the customer is still categorized as having a pot belly, however, all of the alteration should be added to the front of the garment. It is worth noting that customer with "Pigeon Chests" may disguise pot bellies using this method. The term Pigeon Chest is used to describe an individual with small shoulder blades and a large chest, somewhat resembling a pigeon in appearance. As a precaution, if the BOA Chest to Top Girth ratio described above is greater than 0.23, all of the alteration should be added to the front of the garment. Finally if the Profile Waist to Profile Chest ratios is greater than 1.20, and the seat is less than the coat size, a portly alteration should be applied.

When determining the hip/seat measurements for the customer several rules should be applied. In addition, some guidelines need to be followed when taking the customer's hip/seat measurements using a body scanning machine. For example, 1 inch should be added to the scanned measurements where the customer is wearing a body stocking, and 2 inches added when the customer is scanned wearing bicycle shorts, lycra pants or similar garment.

Normally, a customer's hip/seat measurement should equal the coat size. If this is not the case, a determination must be made as to the customer's hip/seat category for alterations as shown in step 525.

Generally, if the customer's seat measurement is smaller than the coat size, the customer has a small seat. In such instances, the garment should be altered to reduce the seat. In one embodiment of the invention, if the customer's seat measurement is up to and including one inch smaller than the coat size (normal size), the garment should be altered to reduce the seat ⅛" on each side of the garment. In addition to the foregoing, if the customer's seat measurement is greater than one inch smaller than the coat size, the front of the garment should also be altered for every additional inch under the norm, in addition to ⅛" being taken in on each side of the garment for every inch under the norm.

Conversely, if the customer's seat measurement is greater than the coat size, the customer has a large seat. If the customer's seat measurement is more than one inch larger than the norm, the alteration should add ¼" to the front and ⅛" to the sides of the garment for every inch, over one inch above the norm (coat size). However, the amount added to the front of the garment should only be the amount greater than that added for the coat waist.

Once the customer's seat/hip measurement is categorized, a measurement must be taken to determine if the customer, additionally, has a flat seat. To take this measurement, the vertical reference plane illustrated in FIG. 10 may be used. The vertical reference plane is established at the customer's shoulder blade. A measurement is then taken from the vertical reference plane to the customer's seat at the widest point of the seat. The widest point of the seat is determined by determining the farthest protruding point on the buttock when viewing a profile of the customer.

If the measurement is between 0.5 and 1.0 inches, the customer is categorized as having a flat seat. Accordingly, the customer's garment should be altered to flatten the seat ¼". If the measurement is greater than 1.0 inches, the garment should be altered to flatten the seat ½". However, if the customer was previously determined to have a normal seat (i.e. hip/seat equals coat size), the altered amount taken out of the seat must be added to the side to maintain the customer's overall hip/seat measurement.

Once the hip/seat alterations are determined the jacket and sleeve lengths are determined as shown in steps 530 and 535 respectively. In one embodiment of the invention, the jacket length is determined by measuring the distance from the base of the floor to the bottom of the customer's ear while the customer is standing in his or her normally erect posture. The measurement is then divided in half to determine a preliminary jacket length. The customer may then be asked if they have any preferences for the jacket length, i.e. shorter or longer than the determined length.

There are several variables that may effect the alterations of the customer's sleeves. These variables comprise armhole, elbow, arms (front or back) and sleeve length alterations.

Alterations to the armhole and elbow are largely dependent on feedback from the customer. If the customer had indicated that the coat feels tight under his arms while he is not moving, the armhole opening should be increased. Similarly, if the customer indicates that the coat feels tight when he bends his arm, the sleeve should be widened at the elbow.

The alterations for altering the arms from or back are somewhat more complex. In one embodiment of the invention, the customer's body is scanned with arms his arms at his side. The position of his elbows to the back of his arm is noted and compared to a normal value previously established. The pattern for the arms is then altered based on this differential to allow the sleeve to swing more to the front than the back as required.

The goal in determining sleeve length is to provide approximate sleeve length, anticipating a tailor to finish the sleeves. After the first garment is made, the exact inseam will be established.

Figure 11:
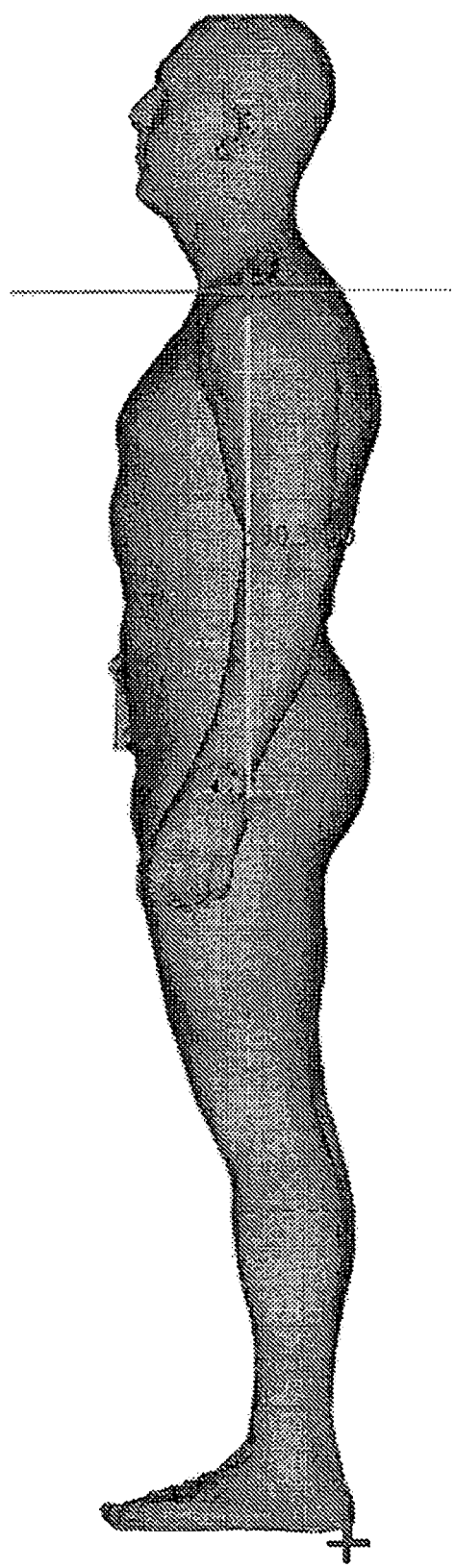
FIG. 11 is a diagrammatic representation showing the establishment of a shoulder point according to one embodiment of the present invention.

When determining sleeve length, a measurement is first taken from the top of the arm to the wrist. The top of the arm is determined by establishing a vertical plane at the back of the armpit. A shoulder point is then established where the vertical plane intersects with a horizontal plan at the top of the arm as shown in FIG. 11. A measurement is then taken from the shoulder point down the middle of the arm, following the angle of the arm, to a plane at the junction of the wrist and the inside of the hand, to determine the arm length. The arm length is then divided by the height of the customer (for short, regular, or long) as illustrated in the following table.

| COAT LENGTH | HEIGHT FOR SLEEVE RATIO |
| --- | --- |
| Short | 5'7" (170.2 cm) |
| Regular | 5'9½" (176.5 cm) |
| Long | 6'½" (181.6 cm) |

A normal arm length to height ration is 0.360. Based on this norm, the customer's sleeve length should be altered (add or subtract) ¹⁄₁₆" (0.0625") for every thousandth of an inch the customer's actual arm/height ratio is greater or less than the norm. However, the minimum alteration should be ¼". In addition, if the customer desires to show his shirt cuff, the alteration should subtract an additional ¼ inch from the sleeve length.

Although the above described rules apply to fitting the customer for a jacket (coat), a similar methodology can be used fit the customer for trousers and shirts.

Figure 12:
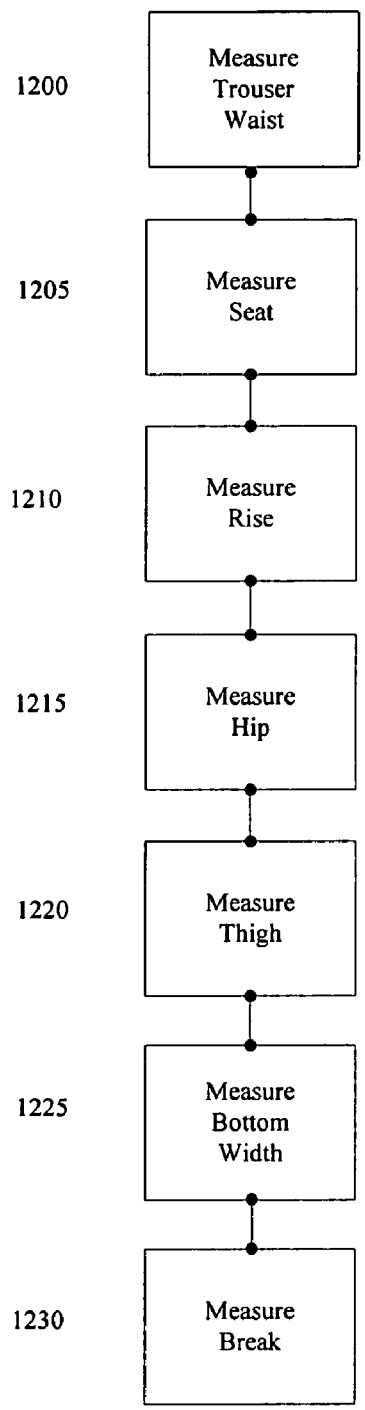
FIG. 12 shows a flow chart illustrating the steps to fit a customer for trousers according to one embodiment of the present invention.

FIG. 12 depicts a flow chart showing the steps to fit a customer for trousers according to one embodiment of the invention.

Figure 13:
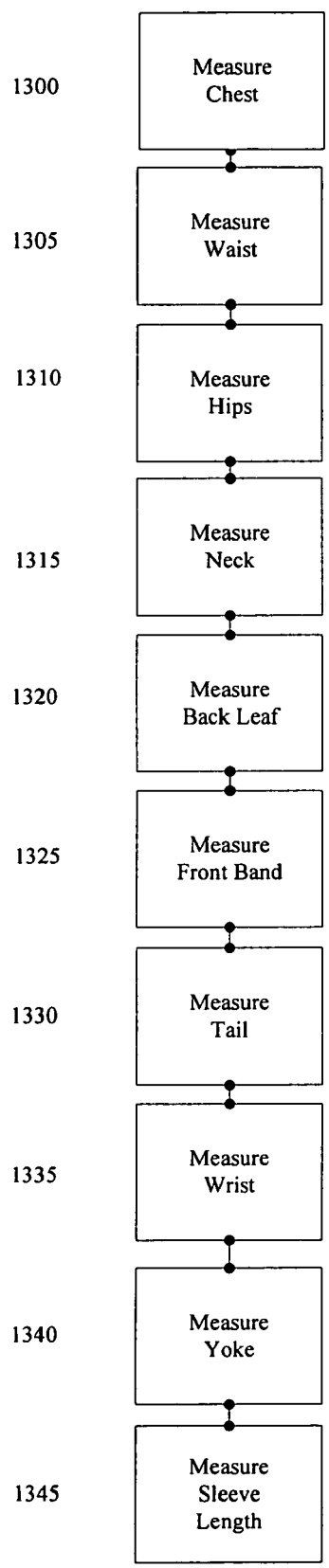
FIG. 13 shows a flow chart illustrating the steps to fit a customer for a shirt according to one embodiment of the present invention.

FIG. 13 depicts a flow chart showing the steps to fit a customer for a shirt according to one embodiment of the invention.

The present system and method may also be applied to the fitting of so called ready-made clothing for the customer, however there are no try-on garments or alterations to a standard pattern. Instead, the body dimensions and ratios obtained from the customer are used in conjunction with ratios and dimensions for the desired style of garment, as well as the customer's responses to the queries to recommend a size for the given garment.

Figure 14:
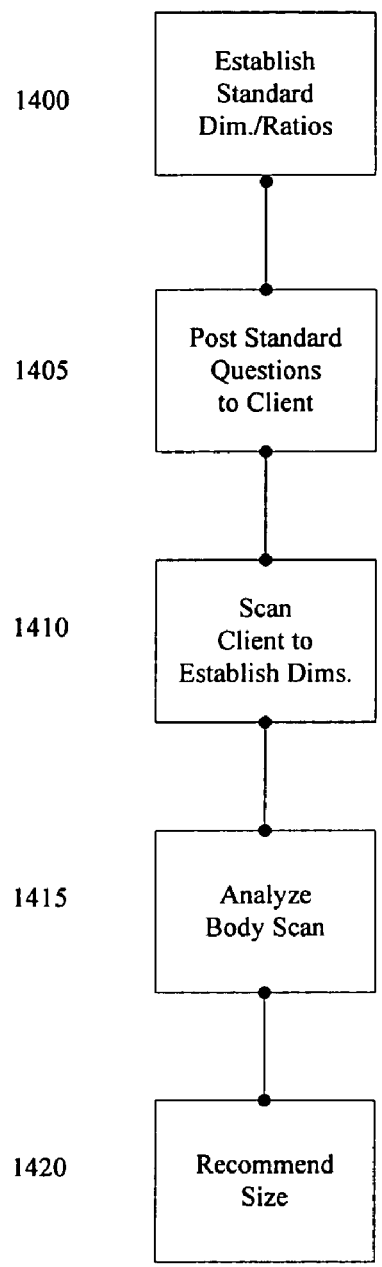
FIG. 14 shows a flow chart illustrating the steps to obtain an analyze information about an individual's body, personal style and fit preferences so that the size of particular clothing for that individual can be recommended according to one embodiment of the present invention.

Turning now to FIG. 14, a flow chart illustrating the steps to obtain and analyze information about an individual's body, personal style and fit preferences so that the size of particular clothing for that individual can be recommended according to one embodiment of the present invention. Although the present embodiment generally describes recommending a jacket (coat) for the customer, this method may also be applied to other garments and apparel, for example trousers, shirts, blouses and sweaters.

As described in the custom tailored method, the first step in the process is to establish standard body dimensions and ratios for a given garment style as shown in step 1400. This step only needs to be performed once for each garment style. If the basic silhouette of a style is the same as another style, the standard body dimensions and ratios will work for both styles. An individual analysis is only required when a garment has a different silhouette. By way of example, in the case of traditionally tailored men's clothing or shirts, the silhouettes may vary very little. Therefore, this step need only be used for non-traditional men's garments and women's garments. The process of establishing standard body dimensions and ratios for a given garment style according to one embodiment of the invention was previously described in FIG. 2.

The salesperson then asks a couple of simple questions, as shown in step 1405, to determine the customer's fit preferences. The following inquiries represent example questions that may be posed to the customer:

(For trousers) At what height do you wear your trousers?
What is your preferred length of coat or skirt?

A body scan of the customer is then taken to establish his or her body dimensions as shown in step 1410. In one embodiment of the invention, at least two body scans are taken, each with the customer posing in a different position. Illustrations showing the two posed positions for the customer during the body scans, i.e. Scan 1 and Scan 2 respectively as previously described in FIGS. 3 and 4.

Once the client's body scans have been taken, the scanned images are analyzed as shown in step 1415. This process comprises the application of a set of rules to measurements taken from the client's body scan. The rules are developed based on the style, fit and tolerances of the client selected garment as previously described. The analysis thus comprises an comparison of the client's body scan to standard body dimensions and ratios for the particular style of garment the customer has chosen, and further incorporates the customer's answers responses to the questions posed in step 1405. Once the rules are applied to the client's body scan, a recommendation of size for the given garment style is made as shown in step 1420.

In one embodiment of the invention, the analysis of the scanned images are performed by a computer system. In other embodiments of the invention, the analysis of the scanned images are performed manually by a trained individual. In still further embodiments of the invention, the analysis of the scanned images are performed by a trained individual with the assistance of a computer system.

Although the present invention has been described in relation to particular preferred embodiments thereof, many variations and modifications and other uses may be made without departing from the invention. Accordingly, it is intended that all such alterations and modifications be included within the spirit and scope of the invention as defined in the appended claims.

What is claimed is:

1. A method of using a computer system for applying at least one rule to alter a clothing pattern representing a garment style, the method comprising the steps of:

scanning, by at least one body scanner, ideal individuals for a plurality of respective garment styles;

determining, by the computer system, standard body dimensions and ratios from the scanning of the ideal individuals for each of the respective garment styles;

establishing a plurality of rules for altering a plurality of clothing patterns of the garment styles based at least in part on the standard body dimensions and ratios;

obtaining information from an individual representing preferences of garment style and fit of the individual;

selecting a try-on garment made from one of the plurality of clothing patterns, wherein the selecting the try-on garment is based at least in part on the individual's garment style and fit preferences;

scanning, by a body scanner, the individual to obtain the individual's body measurements;

determining, by the computer system, the individual's body dimensions and ratios from the individual's body measurements;

determining at least one differential by comparing the individual's body dimensions and ratios to the standard body dimensions and ratios for the garment style;

selecting at least one rule of the plurality of rules, wherein the selecting the at least one rule is based at least in part on the at least one differential; and applying the at least one rule to alter the one of the plurality of clothing patterns.

2. The method of claim 1, further comprising:

determining at least one other individual for at least one of the garment styles;

scanning, by the at least one body scanner, the at least one other individual to determine the at least one other individual's body dimensions and ratios; and determining, by the computer system, a fit tolerance for the garment style by comparing the at least one other individual's body dimensions and ratios to the standard body dimensions and ratios, wherein the establishing at least one of the plurality of rules is based at least in part on the fit tolerance.

3. The method of claim 2, comprising developing the at least one rule based at least in part on the style, fit and fit tolerances of the clothing pattern associated with the try-on garment.

4. The method of claim 1, wherein the scanning the individual comprises taking at least two body scans of the individual, wherein each of the two scans is in a different position of the individual.

5. The method of claim 1, further comprising applying the at least one of the plurality of rules to measurements taken from the body scan.

6. The method of claim 1, wherein the comparing is performed by the computer system or by a trained individual with the assistance of the computer system.

7. The method of claim 1, further comprising providing a recommended size for the particular garment for the individual.

8. The method of claim 1, further comprising altering the pattern by incorporating the information regarding the individual's personal style and fit preferences.

9. The method of claim 1, wherein the determining the body dimensions of the individual comprises defining a horizontal or vertical plane from at least one point on the scan.

10. The method of claim 1, further comprising manufacturing a new garment in accordance with the altered clothing pattern.

11. The method of claim 1, wherein the body scanner scanning the individual is one of the at least one body scanner scanning the ideal individuals.

12. A computer program product, comprising a computer usable medium having a computer readable program code embodied therein, said computer readable program code adapted to be executed to at least partially implement a method for altering a clothing pattern, the method comprising:

scanning, by at least one body scanner, ideal individuals for a plurality of respective garment styles;

determining, by the computer usable medium, standard body dimensions and ratios from the scanning of the ideal individuals;

establishing a plurality of rules for altering a plurality of clothing patterns of the garment styles based at least in part on the standard body dimensions and ratios;

obtaining information from an individual representing preferences of garment style and fit of the individual;

selecting a try-on garment made from one of the plurality of clothing patterns, wherein the selecting the try-on garment is based at least in part on the individual's garment style and fit preferences;

scanning, by a body scanner, the individual to obtain the individual's body measurements;

determining, by the computer usable medium, the individual's body dimensions and ratios from the individual's body measurements;

determining at least one differential by comparing the individual's body dimensions and ratios to the standard body dimensions and ratios for the garment style;

selecting at least one rule of the plurality of rules, wherein the selecting the at least one rule is based at least in part on the at least one differential; and applying the at least one rule to alter the one of the plurality of clothing patterns.

13. A system for applying at least one rule to alter a clothing pattern representing a garment style, the system comprising:

at least one body scanner operable to scan ideal individuals determined for a plurality of respective garment styles;

a computer system operable to determine standard body dimensions and ratios from the scans of the ideal individuals;

a database, accessible by the computer system, storing a plurality of rules established for altering a plurality of clothing patterns of the garment styles based at least in part on the standard body dimensions and ratios;

a try-on garment made from one of the plurality of clothing patterns, wherein the try-on garment is selected based at least in part on an individual's garment style and fit preferences; and a body scanner operable to scan the individual to obtain the individual's body measurements, wherein the computer system is operable to determine the individual's body dimensions and ratios from the individual's body measurements, and further operable to determine at least one differential by comparing the individual's body dimensions and ratios to the standard body dimensions and ratios for the garment style, and further wherein the computer system is further operable to select at least one rule of the plurality of rules at least in part on the at least one differential, and further wherein the computer system is operable to apply the at least one rule to alter the one of the plurality of clothing patterns.

14. The system of claim 13, wherein the body scanner that is operable to scan the individual is one of the at least one body scanner operable to scan the ideal individuals.

* * * * *